Patented Apr. 11, 1939

2,154,401

UNITED STATES PATENT OFFICE 2,154,401

WATER PASTE PAINT

Carl Iddings, Staten Island, N. Y., assignor to The Muralo Company, Inc., a corporation of New York No Drawing. Application December 15, 1933, Serial No. 702,609

17 Claims. (Cl. 134—46)

The present invention relates to water paste paints and their production, which paints are characterized by their unusual qualities of brightness, light reflecting power, covering and hiding power, and which are at the same time easily applicable to surfaces by brushing, spraying and other well known means.

According to the present invention, the paints produced are non-yellowing, provided of course that the pigments themselves are non-yellowing, and they are further characterized by their stability and keeping qualities with respect to time.

One object of this invention is to manufacture water paste paints possessing qualities which are far superior to those already known, closely approaching those of oil paints, which paints moreover retain their inherent property of simple application and are comparatively inexpensive.

Another object of the present invention is to incorporate modifying agents, such as extenders, thinners, plasticizing agents, etc., together with pigments into stable casein dispersions or solutions.

Other objects of this invention will become apparent to those skilled in the art after a study of the following specification.

My improved paints are compounded of a mixture of pigments and stable casein dispersions. These peptized and/or dispersed casein vehicles are described in my co-pending applications, Ser. No. 701,570, filed December 8, 1933, now Patent Number 2,090,630; Ser. No. 701,571, filed December 8, 1933, now Patent Number 2,047,143; Ser. No. 701,572, filed December 8, 1933, now Patent Number 2,023,389; and Ser. No. 701,573, filed December 8, 1933, and it is to be noted that my invention is strictly limited to these peptized and/or dispersed casein solutions.

Briefly, these solutions are prepared by treating commercial acid precipitated casein in the presence of a dispersing agent or agents and water and at elevated temperatures.

As disclosed in application Serial No. 701,573, wherein a treating temperature of 160° F. was found to be too low to produce a smooth appearing solution which will retain its stability for long periods of time, in accordance with my discovery, higher temperatures, namely between 170 and 210° F. are contemplated. As further stated therein, temperatures between 180 and 195° F. have been found to be the optimum for producing my stable casein solutions, and in some cases a minimum of 180° F. is necessary. As clearly set forth in application Serial No. 701,573, the casein is peptized and/or dissolved at elevated temperatures in the presence of small amounts of sodium fluoride or other compounds of alkaline nature or compounds that possess a distinct peptizing or dispersing action on the casein, and a predetermined amount of water. The peptizing agents or solvents listed by way of illustration are fluorides, such as the alkali fluorides, substances such as piperazine, acetamid, ammonium thiocyanate, and sodium silicates. The resultant products are characterized by their stability and substantially uniform or undiminished viscosity over long periods of time for values of pH within the range of 5.7 and 10.5. Solutions within the pH ranges of 7.0 to 10.5, and 8.0 to 9.0, characterized by stability and substantially uniform or undiminished viscosity over long periods of time also have been disclosed.

In application Serial No. 701,572, now Patent 2,023,389, dated December 3, 1935, a temperature range of 120 to 210 degrees F. is contemplated and active silica in various forms and amounts together with one or more soluble fluorides are added to the casein for treatment at such temperatures.

Application Serial No. 701,571, now Patent 2,047,143, dated July 7, 1936, is concerned with viscosity control of the solutions and proposes the use of certain resins for the production of solutions having a relatively high viscosity as compared with their casein content.

Also dealing with viscosity control, is application Serial No. 701,570, now Patent 2,090,630, dated August 24, 1937, which describes the use of alcohols, ethers, esters, and ketones as thinning agents for the solutions in order that high casein, low viscosity solutions may be realized.

Throughout these applications, the importance of stability is recognized, and it is noteworthy that the pH values of all of these solutions may be varied over a wide range extending into both acid and alkaline values, without upsetting the stable nature of the products.

Possessing the characteristic of stability over long periods of time, my solutions can be shipped or kept until, in the usual course of business, they are utilized. Although the initial viscosity of a solution is ordinarily determined within a few days after its preparation, subsequent measurements made up until the time of their use have indicated the viscosity of my solutions to be substantially uniform or substantially undiminished.

The present invention has gone a step farther and utilized these stable solutions in the preparation of stable paints in paste form. Although I have found by experimentation that a combination of about 58–65% of pigments and 35–42% of casein solution is most advantageous, my invention is not limited to these proportions, since satisfactory paints may be made by varying the amounts of casein and pigment in the composition. Sizes for oil or water paints, for example, may be prepared by combining 35–80% of casein solution with 20–65% of pigments. In actual manufacture, I prefer to produce the paint in the form of a stiff, heavy paste which may be thinned with water to proper consistency before application. The paste may be compounded in such a manner that the addition of one half of its volume of water, for example, will result in paints having excellent brushing and working qualities.

A number of pigments may be used in my novel water paste paints, and practically any of the pigments usually employed in oil paints, such as the lithopones, zinc oxides, zinc sulphides, titanium or antimony pigments, etc., may be compounded with stable casein solutions to produce excellent compositions. Various color pigments, such as carbon or lamp black, dyes, iron oxides, chrome yellows, ultramarines, etc., may be incorporated to modify the characteristics of the paint. While only small amounts of extenders can be admixed with oil paints, due to their negligible hiding power in such compositions, it is possible to incorporate large amounts of extenders, such as clays, talcs, whitings, etc., into my casein paste paints. Such extenders materially contribute to the brushing, spreading and hiding qualities of the finished product, and it is for this reason that it is possible to produce inexpensive casein paints with cheap pigments which at the same time have most of the desirable properties of oil paints. The hiding power of the paint may be increased by adding thereto more expensive pigments having a high index of refraction, commonly known as high-index pigments, such as titanium or lithopone pigments and the like. Oils, such as linseed oil, perilla or tung oils, i. e. drying oils, may be admixed to increase the weathering and washable qualities of the casein coatings. I have, furthermore, found that the addition of plasticizing agents, such as sulphonated castor oils, glycols, glycol ethers, glycerine, dextrose or similar materials renders the casein films more flexible.

Since the preparation of the casein vehicles has been fully disclosed in my co-pending applications, set forth above, I deem it unnecessary to discuss this phase of my invention, although I may state that the use of casein dispersions containing approximately 17–20% casein by weight gives very satisfactory results. The following table depicts several examples of my preferred water paste paint compositions, and it is to be noted that the order of mixing the casein vehicle with the other ingredients is of no importance.

|  | Ex. A | Ex. B | Ex. C | Ex. D | Ex. E | Ex. F |
| --- | --- | --- | --- | --- | --- | --- |
|  | Parts | Parts | Parts | Parts | Parts | Parts |
| Casein vehicle | 37.5 | 37.5 | 37.5 | 37.5 | 42.0 | 42.0 |
| Drying oil (with emulsifier if desired) | 5.0 | 5.0 | 5.0 | 5.0 |  |  |
| Titanium dioxide | 11.0 |  |  |  |  |  |
| Crypton |  | 22.0 |  |  |  |  |
| Lithopone |  |  | 36.6 |  | 38.0 | 38.0 |
| Titanium-barium pigment |  |  |  | 44.0 |  |  |
| Talc | 5.0 | 5.0 | 5.0 | 5.0 | 5.0 | 3.0 |
| Barytes | 33.0 | 22.0 | 7.4 |  |  |  |
| Mica | 2.0 | 2.0 | 2.0 | 2.0 | 10.0 |  |
| Glycerine | 1.5 | 1.5 | 1.5 | 1.5 |  |  |
| Whiting |  |  |  |  |  | 10.0 |
| Clay | 5.0 | 5.0 | 5.0 | 5.0 | 5.0 | 7.0 |

I wish to emphasize that my invention is not limited to these specific compositions, since pigments having a high index of refraction as well as pigments having a low index of refractions may be used, and that pastes which require thinning as well as diluted paste paints may be produced, although I prefer to manufacture the paints in the form of stiff pastes in order to minimize the expense of containers and freight. Accordingly the amount of water to be added to such pastes in preparing them for application, will depend upon the nature of the paste. This paste may be produced either as very stiff or very soft in consistency by variation of the proportions of its ingredients.

While I have described above my preferred compositions, I do not wish to be limited to the ingredients, nor to the exact proportions set forth above, since modifications will be apparent to those skilled in the art without departing from the spirit and scope of my invention.

I claim:

1. A water paste paint characterized by its stability and substantially undiminished viscosity over long periods of time, comprising an aqueous dispersion of casein which remains stable for pH values within the range of 5.7 and 10.5 and produced at temperatures ranging from 170–210° F., and a pigment.

2. A water paste paint characterized by its stability and substantially undiminished viscosity over long periods of time, comprising an aqueous dispersion of casein which remains stable for pH values within the range of 5.7 and 10.5 and produced at temperatures ranging from 170–210° F., a pigment and a plasticizing agent.

3. A water paste paint characterized by its stability and substantially undiminished viscosity over long periods of time, comprising an aqueous dispersion of casein which remains stable for pH values within the range of 5.7 and 10.5 and produced at temperatures ranging from 170–210° F., a pigment, a plasticizing agent and an extender.

4. A water paste paint characterized by its stability and substantially undiminished viscosity over long periods of time, comprising an aqueous dispersion of casein which remains stable for pH values within the range of 5.7 and 10.5 and produced at temperatures ranging from 170–210° F., a pigment and a drying oil.

5. A water paste paint characterized by its stability and substantially undiminished viscosity over long periods of time, comprising an aqueous dispersion of casein which remains stable for pH values within the range of 5.7 and 10.5 and produced at temperatures ranging from 170–210° F., a pigment and an extender.

6. A water paste paint characterized by its stability and substantially undiminished viscosity over long periods of time, comprising an aqueous dispersion of casein which remains stable for pH values within the range of 5.7 and 10.5 and produced at temperatures ranging from 170–210° F. in quantities ranging from about 35 to 42 per cent and about 58 to 65 per cent of a pigment, said aqueous dispersion of casein containing about 17 to 20 per cent of casein.

7. A casein paste paint characterized by its stability and substantially undiminished viscosity over long periods of time comprising a pigment and the heat (170–210° F.) reaction product of casein, water and a soluble fluoride, said reaction product remaining stable for pH values within the range of 5.7 to 10.5.

8. A water paste paint characterized by its stability and substantially undiminished viscosity over long periods of time, comprising an aqueous dispersion of casein which remains stable for pH values within the range of 5.7 and 10.5 and produced at temperatures ranging from 170–210° F., and a pigment having a high index of refraction.

9. The method of producing a stable casein paint comprising preparing a solution of casein at an elevated temperature ranging from 170–210° F. for a time sufficient to render the solution stable and of substantially undiminished viscosity over long periods of time and having pH values within the limits of 5.7 and 10.5, and incorporating therewith a pigment and a modifying agent in proportions to yield a composition of pasty consistency characterized by stability and substantially undiminished viscosity over long periods of time.

10. The method of producing a stable casein paint comprising preparing a solution of casein at an elevated temperature ranging from 170–210° F. for a time sufficient to render the solution stable and of substantially undiminished viscosity over long periods of time and having pH values within the limits of 5.7 and 10.5, and incorporating therewith a relatively large amount of pigment in proportions to yield a composition of pasty consistency characterized by stability and substantially undiminished viscosity over long periods of time.

11. A casein paint characterized by its stability and substantially undiminished viscosity over long periods of time comprising a predominating amount of pigment; and a casein solution comprising the heat-reaction product of casein and an alkaline casein solvent, said heat-reaction product being characterized by its stability and substantially undiminished viscosity over long periods of time and by a pH value within the range of 7.0 and 10.5.

12. A casein paste paint characterized by its stability and substantially uniform viscosity over long periods of time, comprising a pigment, and a heat stabilized casein solution which remains stable for pH values of from 5.7 to 10.5.

13. A casein paste paint characterized by its stability and substantially uniform viscosity over long periods of time, comprising a pigment, and a heat stabilized casein solution having a pH value of from 7.0 to 10.5.

14. A casein paste paint characterized by its stability and substantially uniform viscosity over long periods of time, comprising a pigment, and a heat stabilized casein solution having a pH value of from 8.0 to 9.0.

15. A water paste paint characterized by its stability and substantially undiminished viscosity over long periods of time, comprising an aqueous dispersion of casein which remains stable for pH values within the range of 5.7 and 10.5 and produced at temperatures ranging from 180–195° F., and a pigment.

16. A casein paste paint characterized by its stability and substantially uniform viscosity over long periods of time, comprising a pigment, and a heat (180–195° F.) stabilized casein solution which remains stable for pH values of from 5.7 to 10.5.

17. A casein paste paint characterized by its stability and substantially uniform viscosity over long periods of time, comprising a pigment, and a heat (180–195° F.) stabilized casein solution having a pH value of from 7.0 to 10.5.

CARL IDDINGS.